United States Patent
Rosevear

(10) Patent No.: US 8,007,851 B2
(45) Date of Patent: Aug. 30, 2011

(54) BUFFERED TEA-MILK COMPOSITIONS AND ASSOCIATED BEVERAGES AND METHODS FOR PREPARING SAME

(75) Inventor: Katherine Rosevear, Ridgefield, CT (US)

(73) Assignee: Snapple Beverage Corporation, Rye Brook, NY (US)

( * ) Notice: Subject to any disclaimer, the term of this patent is extended or adjusted under 35 U.S.C. 154(b) by 400 days.

(21) Appl. No.: 12/186,119

(22) Filed: Aug. 5, 2008

(65) Prior Publication Data

US 2009/0041914 A1 Feb. 12, 2009

Related U.S. Application Data

(60) Provisional application No. 60/954,441, filed on Aug. 7, 2007.

(51) Int. Cl.
*A23F 3/00* (2006.01)

(52) U.S. Cl. .......... 426/590; 426/597; 426/74; 426/594; 426/650; 426/654; 426/655; 426/330.3; 426/580; 426/573; 426/576; 426/578

(58) Field of Classification Search .................. 426/590, 426/597, 74, 594, 650, 654, 655
See application file for complete search history.

(56) References Cited

U.S. PATENT DOCUMENTS

| | | | |
|---|---|---|---|
| 3,492,131 A | 1/1970 | Schlatter | |
| 4,279,931 A | 7/1981 | Verwaerde et al. | |
| 4,619,834 A | 10/1986 | Zanno et al. | |
| 5,202,145 A | 4/1993 | Wisler et al. | |
| 5,260,085 A | 11/1993 | Wisler et al. | |
| 5,424,082 A | 6/1995 | Dake et al. | |
| 5,597,595 A | 1/1997 | DeWille et al. | |
| 5,679,397 A | 10/1997 | Kuroda et al. | |
| 6,056,989 A | 5/2000 | Sasagawa et al. | |
| 6,413,570 B1 | 7/2002 | Lehmberg et al. | |
| 6,482,456 B1 | 11/2002 | Yokoo et al. | |
| 6,749,879 B2 | 6/2004 | Broz | |
| 6,974,597 B2 | 12/2005 | Ohta et al. | |
| 2005/0153030 A1* | 7/2005 | Young et al. | ............... 426/330.2 |
| 2007/0172571 A1 | 7/2007 | DeBrock et al. | |

FOREIGN PATENT DOCUMENTS

| | | |
|---|---|---|
| EP | 0403825 B1 | 12/1990 |
| WO | 2006083775 A2 | 1/2006 |

OTHER PUBLICATIONS

International Search Report; International Application No. PCT/US2008/072076; International Filing Date Apr. 8, 2008; Date of Mailing Feb. 12, 2008; 6 pages.
Written Opinion of the International Searching Authority; International Application No. PCT/US2008/072076; International Filing Date Apr. 8, 2008; 6 pages.

* cited by examiner

*Primary Examiner* — Anthony Weier
(74) *Attorney, Agent, or Firm* — Cox Smith Matthews Incorporated

(57) ABSTRACT

A beverage composition includes water, milk solids, a tea material, and a pH buffer that itself includes a lactate salt and a carbonate salt. The pH buffer reduces or eliminates precipitation of milk protein when dissolved milk solids are mixed with acidic tea components. Methods of preparing the composition, and packaged beverages are also described.

12 Claims, No Drawings

US 8,007,851 B2

BUFFERED TEA-MILK COMPOSITIONS AND ASSOCIATED BEVERAGES AND METHODS FOR PREPARING SAME

CROSS REFERENCE TO RELATED APPLICATION

This application claims the benefit of U.S. Provisional Patent Application Ser. No. 60/954,441 filed Aug. 7, 2007, which is fully incorporated herein by reference.

BACKGROUND OF THE INVENTION

The popularity of tea-based beverages has increased as the health benefits of antioxidants and other compounds in green and black teas have become known. Beverages that combine milk with tea have the added health benefits associated with milk's protein and calcium. One example of a popular beverage combining tea and milk is chai tea, which combines black tea, milk, water, and spices such as ginger, cardamom, cloves, black pepper, nutmeg, cinnamon, allspice, and mace.

For the convenience of the consumer, it would be desirable to provide a bottled or canned ready-to-drink beverage that combines tea and milk. However, a problem arises in the compatibility of the tea and milk components. Specifically, acidic components of tea reduce the pH of an aqueous solution containing tea extract, and when this low pH aqueous solution is mixed with a solution containing milk protein, denaturation and precipitation of the milk protein can occur. There is therefore a need for a method of producing a milk-tea beverage that allows the tea component and the milk components to be mixed without causing denaturation and precipitation of milk protein.

BRIEF DESCRIPTION OF THE INVENTION

The above-described and other drawbacks are alleviated by a composition comprising: water, milk solids, a tea material, and a pH buffer comprising a lactate salt and a carbonate salt.

Another embodiment is a beverage composition comprising: about 80 to about 90 weight percent water; about 2 to about 9 weight percent milk solids; about 0.1 to about 5 weight percent tea solids; and about 0.05 to about 0.25 weight percent of a buffer comprising about 0.01 to about 0.2 weight percent potassium lactate and about 0.02 to about 0.24 weight percent sodium bicarbonate; wherein all weight percents are based on the total weight of the composition.

Another embodiment is a beverage composition comprising the product obtained on blending a composition comprising: about 80 to about 90 weight percent water; about 2 to about 9 weight percent milk solids; about 0.1 to about 5 weight percent tea solids; and about 0.05 to about 0.25 weight percent of a buffer comprising about 0.01 to about 0.2 weight percent potassium lactate and about 0.02 to about 0.24 weight percent sodium bicarbonate; wherein all weight percents are based on the total weight of the composition.

Another embodiment is a method of preparing a composition, comprising: preparing a buffered tea phase comprising water, a tea material, and a pH buffer comprising a lactate salt and a carbonate salt; and blending the buffered tea phase with a milk phase comprising water and milk solids.

Another embodiment is a method of preparing a beverage composition, comprising: blending water, milk powder, and condensed milk to form a milk phase having a pH of about 6.6 to about 6.8; blending a hydrocolloid, sweetener, water, and a tea material to form a tea phase; blending the tea phase with a buffer comprising potassium lactate and sodium bicarbonate to form a buffered tea phase having a pH of about 7.0 to about 7.3; and blending the milk phase with the buffered tea phase to form a beverage composition having a pH of about 6.8 to about 7.2.

Another embodiment is a method of preparing a packaged beverage, comprising: blending water, milk powder, and condensed milk to form a milk phase having a pH of about 6.6 to about 6.8; blending a hydrocolloid, sweetener, water, and a tea material to form a tea phase; blending the tea phase with a buffer comprising potassium lactate and sodium bicarbonate to form a buffered tea phase having a pH of about 7.0 to about 7.3; blending the milk phase with the buffered tea phase to form a beverage composition having a pH of about 6.8 to about 7.2; homogenizing the composition having a pH of about 6.8 to about 7.2 to form a homogenized composition; adding a flavor to the homogenized composition to form a flavored composition; packaging the flavored composition to form a packaged composition; and pasteurizing the packaged composition to form a pasteurized, packaged composition having a pH of about 6.3 to about 6.6.

Other embodiments, including compositions prepared by the methods, are described in detail below.

DETAILED DESCRIPTION OF THE INVENTION

The present inventor has discovered that a tea-milk composition can be prepared without causing precipitation of milk protein if the tea component is buffered with a lactate salt and a carbonate salt prior to being combined with the milk component. Thus, one embodiment is a beverage composition comprising: water, milk solids, a tea material, and a pH buffer comprising a lactate salt and a carbonate salt. In addition to preventing precipitation of milk protein, the buffer—and particularly the carbonate component of the buffer—contributes carbon dioxide to the headspace of the packaged beverage, thereby helping to preserve the beverage.

The tea-milk composition is a beverage composition, or a composition useful for preparing a beverage composition. Thus, the tea-milk composition can be a beverage composition (such as a packaged ready-to-drink beverage composition), a beverage concentrate, a beverage syrup, or a beverage mix. The term "beverage concentrate" or "beverage base" as used herein means an intermediate beverage product which, when mixed with a sweetening agent and an appropriate amount of water or other suitable liquid or semi-liquid, forms a beverage syrup or alternatively a beverage. The beverage concentrate generally comprises a flavoring agent and optional additives. The term "beverage syrup" as used herein means an intermediate beverage product prepared from a beverage concentrate, a sweetening agent, and an amount of water or other suitable liquid or semi-liquid. The beverage syrup is in a concentrated form that can be diluted to form a beverage. The beverage syrup generally comprises a flavoring agent, a sweetening agent, and optional additives such as food-grade acids, coloring agents, and the like. In some embodiments, a beverage syrup is diluted by a beverage bottler and packaged for sale to consumers. Similarly, the term "beverage mix" as used herein means a concentrated composition that when diluted forms a beverage. In some embodiments, a beverage mix is diluted by a consumer to form a beverage.

The pH buffer comprises a lactate salt. As used herein, "lactate salt" refers to a salt comprising a cation and a lactate ion ($CH_3CH(OH)CO_2^-$). The lactate salt is preferably a food-grade salt. Suitable lactate salts include, for example, sodium lactate, potassium lactate, calcium lactate, magnesium lactate, and mixtures thereof. In some embodiments, the lactate salt comprises potassium lactate.

In addition to the lactate salt, the pH buffer comprises a carbonate salt. As used herein, "carbonate salt" refers to a salt comprising a cation and a bicarbonate anion ($HCO_3^-$), a carbonate dianion ($CO_3^{2-}$), or a combination thereof. The carbonate salt is preferably a food-grade salt. Suitable carbonate salts include, for example, sodium bicarbonate (sodium hydrogen carbonate, $NaHCO_3$), sodium carbonate (disodium carbonate, $Na_2CO_3$), potassium bicarbonate (potassium hydrogen carbonate, $KHCO_3$), potassium carbonate (dipotassium carbonate, $K_2CO_3$), and mixtures thereof. In some embodiments, the carbonate salt comprises sodium bicarbonate.

In some embodiments, the pH buffer comprises potassium lactate and sodium bicarbonate.

The amounts of the buffer components are any amounts that are sufficient to prevent precipitation of milk protein when the buffered tea component is mixed with the milk component, yet not so great as to adversely effect the sensory properties of the beverage. When the composition is a ready-to-drink beverage composition, the amount of the lactate salt can be about 0.005 to about 0.2 weight percent, specifically about 0.01 to about 0.1 weight percent, more specifically about 0.02 to about 0.07 weight percent, based on the total weight of the beverage composition. The amount of the carbonate salt can be about 0.01 to about 0.5 weight percent, specifically about 0.02 to about 0.3 weight percent, more specifically about 0.04 to about 0.1 weight percent, based on the total weight of the beverage composition.

When the composition is a ready-to-drink beverage composition, the complete beverage composition will typically have a pH of about 6 to about 8. For a nonpasteurized or pre-pasteurized beverage composition, the pH can be about 6.5 to about 7.5, specifically about 6.8 to 7.2. For a pasteurized beverage composition, the pH can be about 6 to about 7, specifically about 6.3 to about 6.6.

The beverage comprises milk solids. The milk solids are typically dissolved, although a small fraction of the milk solids can be undissolved. The milk solids can be derived from various sources, including whole milk, lowfat milk, skim milk, cream, half-and-half, powdered milk, condensed milk (including sweetened condensed milk), and the like, and combinations thereof. In some embodiments, the milk solids are derived from a mixture of powdered milk and fat-free sweetened condensed milk.

The amount of milk solids in the beverage is enough to confer a milk flavor to the beverage. When the composition is a ready-to-drink beverage composition, the amount of milk solids can be about 2 to about 9 weight percent, specifically about 4 to about 7 weight percent, based on the total weight of the beverage composition. Milk solids can be measured according to AOAC Official Method 990.2, "Solids (Total) in Milk", AOAC 17th ed. volume 2.

The beverage comprises a tea material. As used herein, the term "tea material" refers to green teas and/or black teas and materials or "tea solids" obtained from any of those teas. The tea material can be, for example, freshly gathered tea leaves, fresh tea leaves that are dried after gathering, fresh tea leaves that have been treated before drying to inactivate enzymes, unfermented tea leaves, partially fermented tea leaves, aqueous extracts of any of the foregoing leaves or portions thereof including tea plant, and concentrated aqueous extracts (also referred to as "tea concentrates"). In some embodiments, the tea component is derived from a mixture of black tea solids, Darjeeling tea concentrate, and black tea concentrate. The amount of tea is sufficient to provide a tea flavor to the beverage. When the composition is a ready-to-drink beverage composition, the amount of tea can be expressed as a weight percent tea solids, which can be about 0.05 to about 5 weight percent, specifically about 0.1 to about 2 weight percent, more specifically about 0.25 to about 1.25 weight percent, based on the total weight of the beverage. As used herein, the term "tea solids" refers to those solids normally present in a tea extract. Polyphenolic compounds are normally the primary component of tea solids. However, tea solids can also include caffeine, proteins, amino acids, minerals and carbohydrates. Tea solids can be measured according to methods known in the art for measuring these components.

In addition to the water, milk solids, tea solids, and pH buffer, the composition can comprise one or more optional ingredients, including flavoring agents (other than the above-described tea and milk components), sweeteners, antioxidants, amino acids, caffeine, coloring agents ("colorants", "colorings"), emulsifiers, flavor potentiators, food-grade acids, minerals, micronutrients, plant extracts, phytochemicals ("phytonutrients"), preservatives, salts other than the buffer salts, stabilizers, thickening agents, medicaments, vitamins, and the like, and combinations thereof. Those of ordinary skill in the art will appreciate that certain additives may meet the definition or function according to more than one of the above-listed additive categories.

Flavoring agents in addition to the above-described tea and milk components can be included in the compositions. Flavoring agents include those flavors known to one of ordinary skill in the art, such as natural flavors, artificial flavors, spices, seasonings, and the like. Exemplary flavoring agents include synthetic flavor oils and flavoring aromatics and/or oils, oleoresins, essences, distillates, and extracts derived from plants, leaves, flowers, fruits, and so forth, and combinations thereof.

Exemplary flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, papaya and so forth. Additional exemplary flavors imparted by a flavoring agent include a milk flavor, a butter flavor, a cheese flavor, a cream flavor, and a yoghurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

In some embodiments, other flavoring agents include aldehydes and esters such as cinnamyl acetate, cinnamaldehyde, citral diethylacetal, dihydrocarvyl acetate, eugenyl formate, p-methylanisol, and so forth can be used. Further examples of aldehyde flavorings include acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), and the like. Generally any flavoring or food additive such as those described in Chemicals Used in Food Processing, publication 1274, pages 63-258, by the National Academy of Sciences, can be used. This publication is incorporated herein by reference.

The flavoring agents can be used in liquid or solid/dried form and can be used individually or in admixture. When employed in dried form, suitable drying means such as spray drying an oil can be used. Alternatively, the flavoring agent is absorbed onto water-soluble materials, such as cellulose, starch, sugar, maltodextrin, gum arabic and so forth or can be encapsulated. In still other embodiments, the flavoring agent is adsorbed onto silicas, zeolites, and the like. The techniques for preparing such dried forms are well known.

In some embodiments, the flavoring agents are used in many distinct physical forms. Without being limited thereto, such physical forms include free forms, such as spray dried, powdered, beaded forms, encapsulated forms, emulsions such as caramel or gum arabic emulsions, and combinations thereof.

In some embodiments, the flavors comprise one or more of ginger, cardamom, cloves, nutmeg, cinnamon, and black pepper flavor.

The particular amount of the flavoring agent effective for imparting flavor characteristics to the composition will depend upon several factors including the flavor, the flavor impression, and the like. Suitable amounts of the flavoring agent can be selected by one of ordinary skill in the art without undue experimentation using guidelines provided. In some embodiments in which the composition is a ready-to-drink beverage composition, the flavoring agent can be present in a beverage composition from about 0.1 to about 8.0 weight percent based on the total weight of the composition, specifically about 0.4 to about 6 weight percent, and more specifically about 1.0 to about 3.0 weight percent each based on the total weight of the beverage composition.

Some embodiments also may include a sweetening agent to provide a sweet taste to the beverage. Sweetening agents may include sugar sweeteners, sugarless sweeteners, and combinations thereof.

Sugar sweeteners generally include saccharides. Suitable sugar sweeteners include monosaccharides, disaccharides and polysaccharides such as sucrose (sugar), dextrose, maltose, dextrin, xylose, ribose, glucose, mannose, galactose, fructose (levulose), lactose, invert sugar, fructooligosaccharide syrups, partially hydrolyzed starch, corn syrup solids, such as high fructose corn syrup, sucramalt, tagatose, trehalose, and combinations thereof.

Suitable sugarless sweetening agents for use in the concentrate include sugar alcohols (or polyols), such as glycerol, sorbitol, xylitol, mannitol, galactitol, maltitol, hydrogenated isomaltulose (isomalt), lactitol, erythritol, hydrogenated starch hydrolysate, polyglycitol (e.g., syrup or powder), stevia and combinations thereof.

Suitable hydrogenated starch hydrolysates include those disclosed in U.S. Pat. Nos. 25,959, 3,356,811, 4,279,931 and various hydrogenated glucose syrups and/or powders which contain sorbitol, hydrogenated disaccharides, hydrogenated higher polysaccharides, and combinations thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN™, a line of commercially available products manufactured by Roquette Freres of France, and HYSTAR™, a line of commercially available products manufactured by Lonza, Inc., of Fairlawn, N.J., also may be useful.

In some embodiments, the sweetening agent is present in amounts of about 0.01 to about 25 weight percent based on the total weight of the composition, specifically about 0.1 to about 15 weight percent, more specifically 1.0 to about 10 weight percent, and yet more specifically 2.0 to about 5.0 weight percent each based on the total weight of the composition.

Some embodiments may include high-intensity sweeteners in the composition. Without being limited to particular sweeteners, representative categories and examples include:

(a) water-soluble sweetening agents such as dihydrochalcones, monellin, steviosides, rebaudiosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and combinations thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1, 2,3-oxathiazine-4-one-2,2-dioxide (Acesulfame-K), the free acid form of saccharin, and combinations thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), N—[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and combinations thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxysucrose, and combinations thereof;

(e) protein based sweeteners such as thaumaoccous danielli (Thaumatin I and II); and (f) the naturally occurring sweetener monatin (2-hydroxy-2-(indol-3-ylmethyl)-4-aminoglutaric acid), its isomers, blends of its isomers, racemic mixtures, and its derivatives.

Many sweetening agents, including some previously discussed, can be categorized as natural sweeteners, for example L-alanine, arabinose, banana extract, carob, cellobiose, corn syrup (including high fructose corn syrup and corn syrup solids), dextrin, dextrose, Dioscoreophyllum cumminsii (Serendipity Berry), erythritol, fructooligosaccharide (FOS), fructose, (including "liquid fructose"), galactose, glucose, glycine, glycyrrhizin, honey, inulin, isomalt, invert sugar, lactitol, lactose, lo han (lo han kuo; lo han guo; lohan guo; lohan kuo), lo han derivatives, maltitol, maltodextrin, maltose, mannitol, mannose, maple syrup, molasses, partially hydrogenated starch hydrolysate, partially hydrolyzed starch, polydextrose solution, polyglycitol, raftilose, miraculin (Richadella dulcifica (Miracle Berry)), ribose, rice syrup, sorbitol, sorbose, stevia, stevioside, rebaudioside, sucralose, sucrose, sugar beets (e.g., dehydrated filaments of), D-tagatose, thaumatin, xylitol, xylose, and combinations thereof.

The sweetening agent can be used individually or as mixtures. For example, in some embodiments, the sweetener comprises sugar (sucrose) and fructose.

The sweetening agents can be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and combinations thereof. In general, an effective amount of sweetener can be utilized to provide the level of sweetness desired, and this amount may vary with the sweetener selected. Suitable amounts for each type of sweetener can be selected by one of ordinary skill in the art without undue experimentation.

Flavor potentiators are materials that can intensify, supplement, modify or enhance the taste and/or aroma perception of a composition without introducing a characteristic taste and/or aroma perception of their own. In some embodiments, potentiators designed to intensity, supplement, modify, or enhance the perception of flavor, sweetness, tartness, umami, kokumi, saltiness, and combinations thereof.

Examples of suitable potentiators, also known as taste potentiators. include neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), sugar acids, potassium chloride, sodium acid sulfate, hydrolyzed vegetable proteins, hydrolyzed animal proteins, yeast extracts, adenosine monophosphate (AMP), glutathione, nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt), sugar beet extract (alcoholic extract), sugarcane leaf essence (alcoholic extract), curculin, strogin, mabinlin, gymnemic acid, hydroxybenzoic acids, 3-hydrobenzoic acid, 2,4-dihydrobenzoic acid, citrus aurantium, vanilla oleoresin, sugarcane leaf essence, maltol, ethyl maltol, vanillin, licorice glycyrrhizinates, compounds that respond to G-protein coupled receptors (T2Rs and T1Rs) and taste potentiator compositions that impart kokumi, as disclosed in U.S. Pat. No. 5,679,397 to Kuroda et al., which is incorporated in its entirety herein by reference, and combinations thereof. "Kokumi" refers to materials that impart "mouthfulness" and "good body".

Sweetener potentiators, which are a type of taste potentiator, enhance the taste of sweetness. In some embodiments, exemplary sweetener potentiators include, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, hydroxybenzoic acids, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), and combinations thereof.

Additional examples of potentiators for the enhancement of salt taste include acidic peptides, such as those disclosed in U.S. Pat. No. 6,974,597 of Ohta et al., herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

Suitable salts for use in the composition include, alkali or alkaline earth metal chlorides, glutamates, and the like. For example, the salt can be monosodium glutamate, potassium chloride, sodium chloride, or a combination thereof. The salts can be added to the beverage as a flavor potentiator.

Suitable food-grade acids for use in the composition include, for example, acetic acid, adipic acid, ascorbic acid, butyric acid, citric acid, formic acid, fumaric acid, gluconic acid, lactic acid, malic acid, phosphoric acid, oxalic acid, succinic acid, tartaric acid, and combinations thereof. The food-grade acid can be added as acidulant to control the pH of the beverage and also to provide some preservative properties; or to stabilize the beverage.

The pH of the beverage can be influence not only by the above-described buffers and food acids, but also via addition of carbon dioxide.

In some embodiments, the tartness of the composition may be varied by selecting and combining acids to provide a desired tartness perception. Some factors to consider in determining a desired tartness include, for example, the acid's dissociation constant, solubility, pH, etc. These variables can be measured by measuring the titratable acidity of the composition.

Coloring agents can be used in amounts effective to produce a desired color for the composition. The colorants may include pigments, natural food colors, and dyes suitable for food, drug and cosmetic applications. A full recitation of all F.D.& C. colorants and their corresponding chemical structures can be found in the Kirk-Othmer Encyclopedia of Chemical Technology, 3rd Edition, in volume 5 at pages 857-884, of which text is incorporated herein by reference.

As classified by the United States Food, Drug, and Cosmetic Act (21 C.F.R. 73), colors can include exempt from certification colors (sometimes referred to as natural even though they can be synthetically manufactured) and certified colors (sometimes referred to as artificial), and combinations thereof. In some embodiments, exemplary exempt from certification or natural colors can include, annatto extract, (E160b), bixin, norbixin, astaxanthin, dehydrated beets (beet powder), beetroot red/betanin (E162), ultramarine blue, canthaxanthin (E161 g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), and combinations thereof.

In some embodiments, exemplary certified colors can include FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof. In some embodiments, certified colors can include FD&C aluminum lakes. These consist of the aluminum salts of FD&C dyes extended on an insoluble substrate of alumina hydrate. Additionally, in some embodiments, certified colors can be included as calcium salts.

Acceptable coloring agents are specifically water-soluble coloring agents.

Suitable amounts of colorant to provide the desired visual effect can be selected by one of ordinary skill in the art without undue experimentation using guidelines provided. Exemplary amounts of coloring agents can be about 0.005 to about 15 weight percent, specifically about 0.01 to about 6 weight percent, and more specifically about 0.1 to about 2 weight percent each based on the total weight of the composition.

Emulsifiers can be added to the composition to prevent separation of the composition components by keeping ingredients dispersed. Emulsifiers can include molecules that have both a hydrophilic part and a hydrophobic part. Emulsifiers can operate at the interface between hydrophilic and hydrophobic materials of the beverage to prevent separation of the components of the composition. Suitable emulsifiers for use in the compositions include, for example, lecithin (e.g., soy lecithin); monoglycerides and diglycerides of long chain fatty acids, specifically saturated fatty acids, and more specifically, stearic and palmitic acid mono- and diglycerides; mono and diglycerides of acetic acid, citric acid, tartaric acid, or lactic acid; egg yolks; polysorbates (e.g., polysorbate 20, polysorbate 40, polysorbate 60, polysorbate 65, and polysorbate 80), propylene glycol esters (e.g., propylene glycol monostearate); propylene glycol esters of fatty acids; sorbitan esters (e.g., sorbitan monostearates, sorbitan tristearates, sorbitan monolaurate, sorbitan monooleate), Acacia (gum arabic), sucrose monoesters; polyglycerol esters; polyethoxylated glycerols; and the like, and combinations thereof.

Certain components (sometimes referred to as hydrocolloids) that act as thickening agents which can impart added "mouth-feel" to the composition include natural and synthetic gums, for example locust bean gum, guar gum, gellan gum, xanthan gum, gum ghatti, modified gum ghatti, tragacanth gum, carrageenan, and the like; natural and modified starches, for example pregelatinized starch (corn, wheat, tapioca), pregelatinized high amylose-content starch, pregelatinized hydrolyzed starches (maltodextrins, corn syrup solids), chemically modified starches such as pregelatinized substituted starches (e.g., octenyl succinate), and the like; cellulose derivatives, for example carboxymethylcellulose, sodium carboxymethylcellulose, and the like; polydextrose; whey or whey protein concentrate; pectin; gelatin; and combinations thereof. The composition can contain a thickening agent in an amount of about 0.005 to about 0.5 weight percent, specifically about 0.01 to about 0.2 weight percent, more specifically about 0.02 to about 0.07 weight percent, based on the total weight of the beverage.

Preservatives, including antimicrobials, can be added to the composition to provide freshness and to prevent the unwanted growth of bacteria, molds, fungi, or yeast. The addition of a preservative, including antioxidants, may also be used to maintain the composition's color, flavor, or texture. Any suitable preservatives for use in food and beverage products can be incorporated into the compositions. Examples of suitable preservatives include benzoic acid alkali metal salts (e.g., sodium benzoate), sorbic acid alkali metal salts (e.g., potassium sorbate), ascorbic acid (Vitamin C), citric acid, calcium propionate, sodium erythorbate, sodium nitrite, calcium sorbate, butylated hydroxyanisole (BHA), butylated hydroxytoluene (BHT), ethylenediaminetetraacetic acid (EDTA), tocopherols (Vitamin E), straight chain polyphosphates, and a combinations thereof. Those skilled in the art can select appropriate concentrations of preservatives.

The composition can be fortified or enriched with vitamins, minerals, micronutrients, or other nutrients. Micronutrients can include materials that have an impact on the nutritional well being of an organism even though the quantity required by the organism to have the desired effect is small relative to macronutrients, such as protein, carbohydrate, and fat. Micronutrients can include, for example, vitamins, minerals, enzymes, phytochemicals, antioxidants, and combinations thereof.

Suitable vitamins or vitamin precursors include ascorbic acid (Vitamin C), beta carotene, niacin (Vitamin $B_3$), riboflavin (Vitamin $B_2$), thiamin (Vitamin $B_1$), niacinamide, folate or folic acid, alpha tocopherols or esters thereof, Vitamin D, retinyl acetate, retinyl palmitate, pyridoxine (Vitamin $B_6$), folic acid (Vitamin $B_9$), cyanocobalimin (Vitamin $B_{12}$), pantothenic acid, biotin, and combinations thereof.

In some embodiments, vitamins or vitamin precursors can include fat soluble vitamins such as vitamin A, vitamin D, vitamin E, and vitamin K, and combinations thereof. In some embodiments, vitamins or vitamin precursors can include water soluble vitamins such as vitamin C (ascorbic acid), the B vitamins (thiamine or $B_1$, riboflavin or $B_2$, niacin or $B_3$, pyridoxine or $B_6$, folic acid or $B_9$, cyanocobalimin or $B_{12}$, pantothenic acid, biotin), and combinations thereof.

Exemplary minerals include sodium, magnesium, chromium, iodine, iron, manganese, calcium, copper, fluoride, potassium, phosphorous, molybdenum, selenium, zinc, and combinations thereof. The minerals can be provided as a mineral salt, including carbonate, oxide, hydroxide, chloride, sulfate, phosphate, pyrophosphate, gluconate, lactate, acetate, fumarate, citrate, malate, amino acids and the like for the cationic minerals and sodium, potassium, calcium, magnesium and the like for the anionic minerals.

The amount of vitamins or minerals provided in the compositions can be up to or exceeding amounts generally recognized as U.S. Recommended Daily amounts or the Recommended Daily Intake amounts established by the U.S. Food and Drug Administration.

In some embodiments exemplary micronutrients can include L-carnitine, choline, coenzyme Q10, alpha-lipoic acid, omega-3-fatty acids, pepsin, phytase, trypsin, lipases, proteases, cellulases, and combinations thereof.

Antioxidants can include materials that scavenge free radicals. In some embodiments, exemplary antioxidants can include citric acid, rosemary oil, vitamin A, vitamin E, vitamin E phosphate, tocopherols, di-alpha-tocopheryl phosphate, tocotrienols, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

Exemplary nutrients can also include amino acids such as L-tryptophan, L-lysine, L-leucine, L-methionine, 2-aminoethanesulfonic acid (taurine), and L-carnitine; creatine; glucuronolactone; inositol; and combinations thereof.

Phytochemicals ("phytonutrients") are plant derived compounds which may provide a beneficial effect on the health or well-being of the consumer. Phytochemicals include plant derived antioxidants, phenolic compounds including monophenols and polyphenols, and the like. Exemplary phytochemicals include lutein, lycopene, carotene, anthocyanin, capsaicinoids, flavonoids, hydroxycinnamic acids, isoflavones, isothiocyanates, monoterpenes, chalcones, coumestans, dihydroflavonols, flavanoids, flavanols, quercetin, flavanones, flavones, flavan-3-ols (catechins, epicatechin, epigallocatechin, epigallocatechingallate, and the like), flavonals (anthocyanins, cyanidine, and the like); phenolic acids; phytosterols, saponins, terpenes (carotenoids), and combinations thereof.

The phytochemicals can be provided in substantially pure or isolated form or in the form of natural plant extracts. Suitable plant extracts which contain one or more phytochemicals include fruit skin extracts (grape, apple, crab apple, and the like), green tea extracts, white tea extracts, green coffee extract, and combinations thereof. The tea component of the present beverage naturally contributes some phytochemicals.

Various herbals, aromatic plants or plant parts or extracts thereof, can also be included in the compositions for a variety of reasons such as for flavor or for their potential health benefits. Exemplary herbals include Echinacea, Goldenseal, Calendula, Rosemary, Thyme, Kava Kava, Aloe, Blood Root, Grapefruit Seed Extract, Black Cohosh, Ginseng, Guarana, Cranberry, Ginko Biloba, St. John's Wort, Evening Primrose Oil, Yohimbe Bark, Green Tea, Ma Huang, Maca, Bilberry, extracts thereof, and combinations thereof.

One embodiment is a beverage composition comprising: about 80 to about 90 weight percent water; about 2 to about 9 weight percent milk solids; about 0.05 to about 5 weight percent tea solids; and about 0.05 to about 0.25 weight percent of a buffer comprising about 0.01 to about 0.2 weight percent potassium lactate and about 0.02 to about 0.24 weight percent sodium bicarbonate; wherein all weight percents are based on the total weight of the composition. The beverage composition can be a ready-to-drink beverage.

Those of ordinary skill in the art will appreciate that chemical reactions may occur between various components of the composition. For example, a portion of the lactate salt may be neutralized to lactic acid, or a portion of the carbonate buffer may be decomposed to carbon dioxide. So, the chemical composition of the finished beverage may not simply be the sum of its component ingredients. Therefore, the composition can be described as the reaction product of the component ingredients. For example, one embodiment is a beverage composition comprising the product obtained on blending a composition comprising: about 80 to about 90 weight percent water; about 2 to about 9 weight percent milk solids; about 0.05 to about 5 weight percent tea solids; and about 0.05 to about 0.25 weight percent of a buffer comprising about 0.01 to about 0.2 weight percent potassium lactate and about 0.02 to about 0.24 weight percent sodium bicarbonate; wherein all weight percents are based on the total weight of the composition. The beverage composition can be a ready-to-drink beverage.

The invention extends to methods of preparing the beverage. Thus, one embodiment is a method of preparing a beverage composition, comprising: preparing a buffered tea phase comprising water, tea solids, and a pH buffer comprising a lactate salt and a carbonate salt; and blending the buffered tea phase with a milk phase comprising water and milk solids. The method can, optionally, further comprise homogenizing the combined buffered tea phase and milk phase. The method can, optionally, further comprise adding a flavor to the combined buffered tea phase and milk phase. The method can, optionally, further comprise packaging the combined buffered tea phase and milk phase, and pasteurizing the packaged composition.

Another embodiment is a method of preparing a beverage composition, comprising: blending water, milk powder, and condensed milk to form a milk phase having a pH of about 6.6 to about 6.8; blending a hydrocolloid, sweetener, water, and a tea material to form a tea phase; blending the tea phase with a buffer comprising potassium lactate and sodium bicarbonate to form a buffered tea phase having a pH of about 7.0 to about 7.3; and blending the milk phase with the buffered tea phase to form a beverage composition having a pH of about 6.8 to about 7.2. The method can, optionally, further comprise blending the composition having a pH of about 6.8 to about 7.2 with one or more flavors selected from ginger, cardamom, cloves, nutmeg, cinnamon, allspice, mace, and black pepper flavor.

Another embodiment is a method of preparing a packaged beverage, comprising: blending water, milk powder, and condensed milk to form a milk phase having a pH of about 6.6 to about 6.8; blending a hydrocolloid, sweetener, water, and tea solids to form a tea phase; blending the tea phase with a buffer comprising potassium lactate and sodium bicarbonate to form a buffered tea phase having a pH of about 7.0 to about 7.3; blending the milk phase with the buffered tea phase to form a beverage composition having a pH of about 6.8 to about 7.2; homogenizing The composition having a pH of about 6.8 to about 7.2 to form a homogenized composition; adding a flavor to the homogenized composition to form a flavored composition; packaging the flavored composition to form a packaged composition; and pasteurizing the packaged composition to form a pasteurized, packaged composition having a pH of about 6.3 to about 6.6.

The invention extends to beverages prepared by any of the above-described methods.

The invention is further illustrated by the following non-limiting examples.

EXAMPLE 1

A buffered tea milk beverage is prepared using the relative amounts of milk phase, tea phase, buffers, and flavors specified in Table 1 and the detailed composition specified in Table 2.

TABLE 1

Buffered Tea-Milk Beverage

| Component | % by weight |
|---|---|
| Milk Phase | 64.183 |
| Tea Phase | 35.582 |
| Buffers | 0.147 |
| Flavors | 0.088 |

TABLE 2

Composition of Tea Milk Beverage (1500 g batch)

| Ingredient | % w/w | mass [g] |
|---|---|---|
| MILK PHASE | | |
| Water | 53.768 | 806.51 |
| Milk Powder (1% milkfat) | 4.850 | 72.75 |
| Fat Free Sweetened Condensed Milk | 6.110 | 91.65 |
| TEA PHASE | | |
| Water | 29.873 | 448.10 |
| Carrageenan | 0.040 | 0.60 |
| Granulated Sugar | 3.969 | 59.54 |
| Crystalline Fructose | 1.000 | 15.00 |
| Black Tea Solids | 0.072 | 1.08 |
| Tea Concentrate | 0.107 | 1.61 |
| BUFFERS | | |
| Potassium Lactate 60% w/w | 0.067 | 1.00 |
| Sodium Bicarbonate | 0.080 | 1.20 |
| FLAVORS | | |
| Flavors | 0.064 | 0.96 |

The milk phase composition of Table 2 is prepared by adding the ingredients in the order: water, milk powder with 1% milkfat, and fat free sweetened condensed milk, to produce a solution with a pH of about 6.6 to 6.8.

The tea phase composition of Table 2 is prepared in the following steps: a) mixing carrageenan with granulated sugar by hand, b) dissolving carrageenan and sugar in water using a high speed mixer to form a gum solution, c) adding sugar, fructose, and teas to the gum solution with high speed mixing, and d) adding buffers to the tea phase with 5 minutes high speed mixing, to produce a solution having a pH of about 7.0 to 7.3.

The following steps are used to prepare the complete beverage. The milk phase and tea phase previously described are combined and the pH is measured to verify a pH within the range of about 6.8 to 7.2. The resulting unflavored base is homogenized in stages with a pressure of 3500 pounds per square inch in the first stage followed by a pressure of 500 pounds per square inch in the second stage, and the pH is measured again to verify a pH within the range of about 6.8 to 7.2. The flavors are then added to the homogenized, unflavored base, and the resulting composition is mixed. The resulting beverage is used to fill bottles, which are placed in an autoclave and heated at 240° F. for 23 minutes. Representative samples are tested to verify that the final pH is within the range of about 6.3 to 6.6.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A beverage composition packaged in a container comprising:
    water;
    milk solids;
    a tea material;
    at least one hydrocolloid; and
    a pH buffer consisting of a lactate salt and a carbonate salt;
    wherein said composition has a pH of about 6 to about 8;
    wherein the carbonate salt of the buffer contributes carbon dioxide to a headspace region of said container.

2. The composition of claim 1, wherein the lactate salt is selected from the group consisting of sodium lactate, potassium lactate, calcium lactate, magnesium lactate, and mixtures thereof.

3. The composition of claim 1, wherein the lactate salt is potassium lactate.

4. The composition of claim 1, wherein the carbonate salt is selected from the group consisting of sodium bicarbonate, sodium carbonate, potassium bicarbonate, potassium carbonate, and mixtures thereof.

5. The composition of claim 1, wherein the carbonate salt is sodium bicarbonate.

6. The composition of claim 1, wherein the pH buffer consists of potassium lactate and sodium bicarbonate.

7. The composition of claim 1, wherein said pH buffer consists of about 0.005 to about 0.2 weight percent of the lactate salt and about 0.01 to about 0.5 weight percent of the carbonate salt, based on the total weight of the beverage.

8. The composition of claim 1, further comprising about 2 to about 9 weight percent of total milk solids.

9. The composition of claim 1, further comprising about 0.1 to about 5 weight percent tea solids.

10. The composition of claim 1, further comprising at least one flavor.

11. The composition of claim 1, wherein said beverage composition is a beverage concentrate.

12. The composition of claim 1, wherein said beverage composition is a beverage mix.

* * * * *